Jan. 19, 1960  H. O. LÜTCKE ET AL  2,921,428
ROTOR FOR WIRE STRANDING MACHINE
Filed Nov. 21, 1955
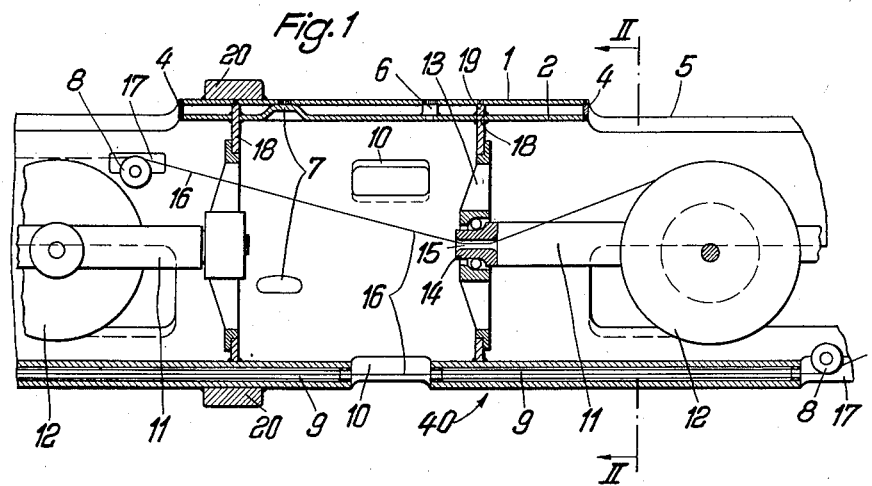
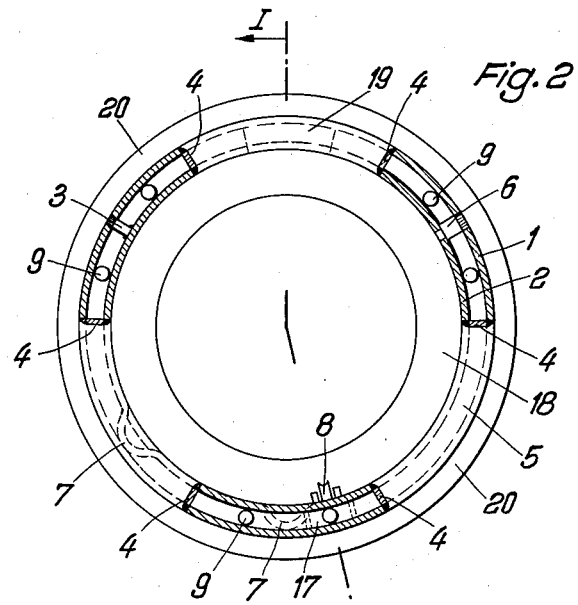
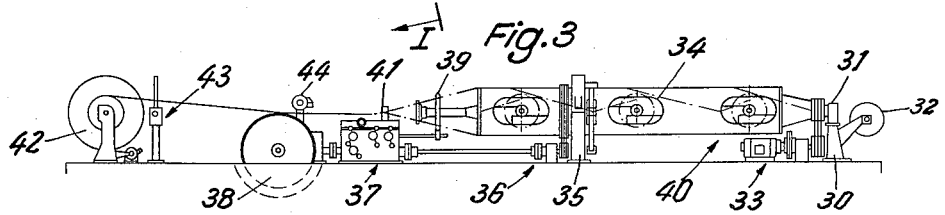
Inventor:
Helmut O. Lütcke and
Hans W. Schinke
by Michael S. Striker
agt.

United States Patent Office 2,921,428
Patented Jan. 19, 1960

2,921,428

ROTOR FOR WIRE STRANDING MACHINE

Helmut O. Lütcke, Ratingen, and Hans W. Schinke, Koln-Mulheim, Germany, assignors to Aktiengesellschaft fur Unternehmungen, Essen, Germany Application November 21, 1955, Serial No. 548,197

Claims priority, application Germany November 22, 1954

11 Claims. (Cl. 57—58.3)

The present invention relates to wire stranding machines for quickly stranding wire, for example, into elongated twisted strands or cables.

More particularly, the present invention relates to rotors of such wire stranding machines.

Conventional rotors of the above type are usually in the form of an elongated tube made of steel, for example, and this tube is necessarily formed with openings passing through its walls so that the tube is weakened by these openings and the resistance of the tube to bending is substantially diminished by the openings which pass through the tube. Thus, with such a conventional rotor the natural frequency of vibration thereof is located at a relatively low speed of rotation, and as a result it is essential to rotate such a rotor below its critical speed. Thus, the speed of rotation of such a conventional rotor is greatly limited, and a rotor of normal diameter can have a peripheral speed of only approximately 25 meters per second. Because of the necessarily low speed of rotation of such rotors the output of the wire stranding machine is limited.

One of the objects of the present invention is to overcome the above drawbacks by providing a wire stranding machine rotor which may be rotated at a far higher speed than a conventional rotor of the type referred to above without approaching the speed at which the natural frequency of vibrations of the rotor occur.

Another object of the present invention is to provide a rotor of relatively light weight which has sufficient stiffness to withstand the forces resulting from high speeds of rotation and which at the same time is capable of absorbing forces resulting from unequal mass distribution.

A further object of the present invention is to provide a rotor which is capable of being easily and inexpensively manufactured.

An additional object of the present invention is to provide a rotor which is capable of operating smoothly and quietly.

With the above objects in view the present invention mainly consists of a rotor for a wire stranding machine, this rotor including a pair of coaxial tubes one of which is located within and fixed to the other in spaced relation thereto. The fixing of the tubes to each other may take the form of suitable spacer means located between and engaging the tubes, and advantage may be taken of the space within the gap between the tubes by locating in this space guides for the wire or the like which is stranded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary sectional elevational view taken along the axis of a rotor constructed according to the present invention, the section of Fig. 1 being taken along line I—I of Fig. 2 in the direction of the arrows;

Fig. 2 is a transverse sectional view taken along line II—II of Fig. 1 in the direction of the arrows; and Fig. 3 is a schematic illustration of the wire stranding machine which includes a rotor having the construction shown on an enlarged scale and in detail in Figs. 1 and 2.

Referring now to the drawings, and to Fig. 3 in particular, it will be seen that the wire stranding machine includes at its right end a stand 30 formed with a bearing 31 which turnably supports the right end of the rotor 40, as viewed in Fig. 3. The stand 30 also carries a spool 32 for rotation about its axis, and this spool 32 carries the core wire about which the other wires are stranded. The core wire from the spool 32 passes into the rotor 40 and then extends in a known way axially along the rotor, while the latter rotates about its axis, out of the left end of the rotor to the stranding point and to structure described below. A pulley drive 33 is connected through suitable belts and pulleys to the right end of the rotor 40 just to the left of the bearing 31, as viewed in Fig. 3, and this drive means 33 drives the rotor 40 so as to rotate the latter about its axis. Within the rotor are located the spool carriers 34, of which three are indicated in Fig. 3. The additional wires to be stranded are taken from these spools and are guided along the interior of the rotating rotor toward the left end thereof. The rotor is also supported for rotation about its axis by a stand 35 which turnably supports a ring 20 which is shown in Fig. 1. Just to the left of the stand 35 the rotor carries pulleys which through suitable belts serve to transmit a drive to the drive means 36 which in turn drives a transmission 37 which may be manually adjusted to regulate the speed of the output from the transmission 37, this transmission 37 being operatively connected to a tension roller 38 in order to rotate the latter about its axis. The several wires which thus enter into and pass along the rotating rotor 40 issue from the left end thereof and respectively pass through apertures of a plate 39 which is carried by and rotates with the rotor. The several wires which pass through the apertures of the plate 39 are stranded together at the stranding point 41, and the stranded wire is maintained under tension and is continually pulled through the rotating rotor by the rotating tension roller 38 about which the stranded wire passes. The stranded wire extends from the tension roller 38 to the take-up spool 42 on which the final stranded wire is placed. A wire guide means 43 guides the wire onto the spool 42 so that the wire is wound in layers on the spool 42, and a counting mechanism 44 is engaged by the stranded wire just before it engages the tension roller 38 in order to count the number of layers of stranded wire which have been wound onto the take-up spool 42.

As has been pointed out above conventional rotors 40 have a limited speed of rotation because of their exceedingly low natural vibration frequency. In accordance with the present invention the rotor 40 has the construction shown in detail in Figs. 1 and 2 in order to overcome this drawback and thus provide a much higher output, and as was mentioned above the rotor 40 of the present invention may be very inexpensively manufactured. Thus, as may be seen from Figs. 1 and 2, the rotor of the present invention is composed of an outer tube 1 and an inner tube 2 located coaxially within and spaced from the outer tube 1. Thus, a space is provided between the tubes 1 and 2, and this space is maintained by a means which extends between and is fixed to the tubes. Thus, spacer members 3 which are rigid and which may be elongated, for example, are located between and fixed to the tubes 1 and 2. Furthermore, the tubes 1 and 2 are formed with aligned openings 5, and the strips 4 form rims for these openings and are fixed to the edges of the tubes 1 and 2 which define the openings 5. As is evident from the drawings the strips 4 are welded to the tubes 1 and 2 so as to also serve to brace the tubes with respect to each other and to maintain the same in spaced relation to each other. Pins 6 may be located between and welded to the tubes in order to maintain the same in spaced relation to each other, and furthermore, the outer tube 1 may be provided with inwardly bulging portions which engage and are fixed to the inner tube 2, or, as is indicated in the drawings, the inner tube 2 may be provided with outwardly bulging portions 7 which engage and are fixed to the outer tube 1, as by being welded thereto, for example. Thus, the bulging portions 7 or the pins 6 may very quickly and easily be spot welded to the tubes.

Guide rollers 8 as well as elongated tubes 9 are provided for guiding the wire or other elements which are to be stranded. The guiding tubes 9 are located in the space between the tubes 1 and 2, so that in this way advantage is taken of this space between the tubes. The wire or other element to be stranded may be initially threaded through the rotor 40 by the operator, and hand holes 10 are formed in the tubes 1 and 2 for this purpose. The hand holes 10 also are in the form of aligned openings of the tubes 1 and 2, and rims similar to the rims 4 may extend between and engage the edges of the tubes 1 and 2 at the openings 10 thereof. These rims which are associated with the openings 10 are provided themselves with openings into which the opposite ends of the tubes 9 extend, so that in this way the rims of the openings 10 serve the additional purpose of maintaining the tubes 9 in a fixed position with respect to the rotor 40. The tubes 9 may extend at their ends into the openings of the rims 4 with a friction fit, so that when any of the tubes 9 become worn through rubbing with the elements 16 which are to be stranded, it is a simple matter to remove the worn tube or tubes 9 and to replace the same with new tubes. In order to thus remove the tubes 9 it is only necessary to shift the same to the left, as viewed in Fig. 1, until the tubes reach the left end of the rotor 40, as viewed in Fig. 3, and the tubes may be very easily removed through openings provided at the left end of the rotor between the tubes 1 and 2 thereof.

The openings 5 of the rotor 40 are located in the region of the spools 12 which carry wire or the like 16 to be stranded, so that the openings 5 permit the operator to quickly and easily insert the spools 12 into the rotor and remove the spool 12 therefrom. Each spool 12 is supported for rotation about its axis by a spool carrier 11 which is provided with opposite legs which support the shaft on which each spool 12 is located. The ends of the legs of each carrier 11 which extend axially along the rotor are fixed to transverse portions which extend across the axis of the rotor, and these transverse portions are provided with journals 14 which are turnably supported by the spiders 13, these spiders 13 having inner and outer rings interconnected by a plurality of arms which extend radially between these rings. As is apparent from Fig. 1 the journal 14 is formed with a bore 15 through which the wire 16 passes, and the opposite ends of the bore 15 are flared outwardly and are rounded as well as hardened and highly polished in order to guide the wire 16 and to resist the wear thereof. From the bore 15 the wire 16 passes from the spool 12 to a guide roller 8 and from the latter the wire enters into the guide tubes 9. The guide rollers 8 are supported by suitable brackets which are fixed to the tubes 1 and 2 at openings 17 thereof. These openings 17 are also composed of aligned openings of the tubes 1 and 2 which are provided with rims fixed to and extending between the edges of the tubes 1 and 2 which define the openings 17, and the brackets which turnably support the guide rollers 18 are fixed to these rims. Furthermore, these rims also are provided with openings which receive end portions of the guide tubes 9, in the manner shown at the lower right hand portion of Fig. 1, so that the rims of the openings 17 also serve to removably support the guide tubes 9. As is apparent from Fig. 1 the rollers 8 are supported in a position where the peripheries thereof are aligned with the wire to be guided. Thus, the periphery of the roller 8 shown at the lower right of Fig. 1 is located at the axis of the lower right tube 9 of Fig. 1, and in the same way the periphery of the upper left roller 8 of Fig. 1 is located in line with the spool 12 at the left of Fig. 1 in order to cooperate with the latter for properly guiding a wire 16.

As is apparent from Fig. 1, the spider 13 is fixed to a ring 18 as by being welded thereto, and this ring 18 is in turn welded at its outer periphery to the inner face of the inner tube 2. Portions of the periphery of the ring 18 extend through openings of the inner tube 2 across the space between the tubes 1 and 2 into engagement with the tube 1. One of these portions 19 is shown in Fig. 1, and as is evident from Fig. 1 the portion 19 of the ring 18 is welded both to the tube 1 and to the tube 2. Thus, this portion 19 of the ring 18 as well as all of the portions 19 of the rings 18 form spacer means which also serve to maintain the tubes in spaced relation to each other and to brace the tubes with respect to each other.

As was mentioned above the outer tube 1 is provided with a bearing ring 20 which serves to rotatably support the tubes for rotation about their common axis.

With the above described structure of the invention it is possible to use in a rotor of a wire stranding machine tubes having a wall thickness which is much lower than the wall thickness of a conventional tube. By providing tubes such as the tubes 1 and 2 which have a wall thickness of approximately half of a conventional tube used as a rotor of a wire stranding machine, it is possible to provide a rotor of light weight having a much greater stiffness than a conventional rotor so that a much higher natural frequency of vibration is obtained with the structure of the invention. A one piece tube which has a resistance to bending equivalent to that of the rotor described above requires extremely large accelerating and braking forces because of its much greater mass, and such a large accelerating force can only be provided by a very powerful drive means and very powerful brakes are required to provide the necessary braking force for such a rotor.

Because of the very light weight and great stiffness of the rotor of the present invention, it is possible to completely do away with the accurate finishing required for the inner and outer surfaces of a conventional one piece tube. In fact, it is sufficient to make the tubes of the rotor of the present invention from sheets of metal which are rolled into tubular form and welded together along the seams of the thus formed tubes, and it is only necessary then to dynamically balance the resulting rotor. In this way the cost of manufacture is kept very low. Furthermore, because of the great stiffness of the rotor of the invention the stresses resulting from uneven mass distribution of the rotor are absorbed without any additional steps taken for this purpose and at the same time the rotor operates very smoothly and quietly.

It should be noted that although many different types of spacer means have been described above for maintaining the tubes 1 and 2 in spaced relation to each other as well as bracing these tubes with respect to each other, it is possible for only one of the above types of bracing means to be used. Thus, if desired only bulging portions similar to bulging portions 7 may be used, or only spacer pins similar to pins 6 may be used.

In the manufacture and assembly of the rotor which is composed of the tubes 1 and 2, the spacer elements, irrespective of their form, are first fixed to the inner tube 2 in a position extending from the outer face thereof. Then the outer tube 1 is placed about the tube 2 with the spacers located between the tubes 1 and 2. The outer tube 1 is provided with openings which are located at the positions where the spacers engage the outer tube 1. Thus, in the example shown in Fig. 1, just to the right of the ring 20 the outer tube 1 is provided with an opening aligned with the bulging portion 7, with an opening aligned with the pin 6, and with an opening aligned with the rib 19. Through these openings the spacer elements 7, 6 or 19 are welded to the tube 1. Also the rims 4 of the openings 5 as well as the rims of the openings 10 and 17 are welded to the edges of the tubes 1 and 2 which define these openings after the tubes 1 and 2 are in the position shown in Fig. 1 with respect to each other.

It will be understood that each of the elements described above, or two or more together, may also find a useful application in other types of rotors differing from the types described above.

While the invention has been illustrated and described as embodied in rotors for wire stranding machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A rotor for a wire stranding machine, comprising, in combination, a pair of elongated coaxial tubes one of which is located within and spaced from the other; and means fixing said tubes to each other in spaced relation, said means including a plurality of spacer portions extending between said tubes and fixed to at least one of said tubes, said spacer portions being composed at least in part of bulging portions of one tube extending toward and fixed to the other of said tubes.

2. A wire stranding machine rotor comprising, in combination, a pair of elongated coaxial tubes extending substantially over the whole length of the rotor and one of which is located within and spaced from the other; and a plurality of spacers located between and fixed to said tubes for maintaining the same in spaced relation to each other.

3. A wire stranding machine rotor comprising, in combination, a pair of elongated coaxial tubes extending substantially over the whole length of the rotor and one of which is located within and spaced from the other; and a plurality of spacers located between and fixed to said tubes for maintaining the same in spaced relation to each other, said spacers including a plurality of pins extending between and fixed to said tubes.

4. A wire stranding machine rotor comprising, in combination, a pair of elongated coaxial tubes one of which is located within and spaced from the other; and a plurality of spacers located between and fixed to said tubes for maintaining the same in spaced relation to each other, said spacers including a plurality of elongated strips located between said tubes, having one edge fixed to the outer surface of the inner one of said tubes, and having an opposite edge fixed to the inner surface of the outer one of said tubes.

5. A rotor for a wire stranding machine, comprising, in combination, a pair of coaxial tubes one of which is located within and spaced from the other, said tubes respectively being formed with aligned openings; and a plurality of rims respectively extending along the edges of said tubes which define said openings and extending between and being fixed to said tubes at said openings for maintaining said tubes in spaced relation to each other.

6. A rotor for a wire stranding machine comprising, in combination, a pair of elongated tubes one of which is located within and spaced from the other; a ring fixed to the inner one of said tubes in the interior thereof and having an outer peripheral portion engaging the inner face of said inner tube and having parts thereof extending through said inner tube across the space between said tubes into engagement with and being fixed to the outer one of said tubes so that said ring serves to maintain said tubes in spaced relation to each other and to brace said tubes with respect to each other; and support means located within said inner tube and fixed to said ring for supporting a spool carrier.

7. A rotor for a wire stranding machine comprising, in combination, a pair of elongated tubes one of which is located within and spaced from the other; a ring fixed to the inner one of said tubes in the interior thereof and having an outer peripheral portion engaging the inner face of said inner tube and having parts thereof extending through said inner tube across the space between said tubes into engagement with and being fixed to the outer one of said tubes so that said ring serves to maintain said tubes in spaced relation to each other and to brace said tubes with respect to each other; and support means located within said inner tube and fixed to said ring for supporting a spool carrier, said support means being in the form of a spider having a central bearing portion for turnably supporting the spool holder.

8. A rotor for a wire stranding machine comprising, in combination, a pair of elongated tubes one of which is located within and spaced from the other, said tubes being coaxial with each other and being formed with aligned openings passing therethrough, and the inner one of said tubes being provided with outwardly bulging portions which engage and are fixed to the outer one of said tubes; and rim means extending between said tubes and engaging the edges thereof which define said openings for maintaining said tubes in spaced relation to each other and for bracing said tubes with respect to each other.

9. A rotor for a wire stranding machine comprising, in combination, a pair of elongated tubes one of which is located within and spaced from the other, said tubes being coaxial with each other and being formed with aligned openings passing therethrough, and the inner one of said tubes being provided with outwardly bulging portions which engage and are fixed to the outer one of said tubes; rim means extending between said tubes and engaging the edges thereof which define said openings for maintaining said tubes in spaced relation to each other and for bracing said tubes with respect to each other; and spacer members located between and engaging said tubes for also maintaining the same in spaced relation to each other.

10. A rotor for a wire stranding machine comprising, in combination, a pair of elongated tubes one of which is located within and spaced from the other, said tubes being coaxial with each other and being formed with aligned openings passing therethrough, and the inner one of said tubes being provided with outwardly bulging portions which engage and are fixed to the outer one of said tubes; rim means extending between said tubes and engaging the edges thereof which define said openings for maintaining said tubes in spaced relation to each other and for bracing said tubes with respect to each other; and elongated guiding tubes located in the space between said first-mentioned tubes for guiding elongated flexible elements to be stranded through the space between said first-mentioned tubes.

11. A rotor for a wire stranding machine comprising, in combination, an elongated outer tube; an elongated inner tube located coaxially within and spaced from said outer tube; means fixed to and extending across the space between said tubes for maintaining said tubes in spaced relation to each other and for bracing said tubes with respect to each other; guide means carried by said tubes in the interior of said inner tube and in the space between said tubes for guiding elongated elements to be stranded; and means carried by said outer tube for guiding the same for rotation with said inner tube about its axis.

References Cited in the file of this patent

UNITED STATES PATENTS

| | | |
|---|---|---|
| 16,694 | Pine | Feb. 24, 1857 |
| 2,147,065 | Somerville | Feb. 14, 1939 |
| 2,477,690 | French | Aug. 2, 1949 |

FOREIGN PATENTS

| | | |
|---|---|---|
| 563,378 | Great Britain | Aug. 11, 1944 |
| 894,615 | France | Mar. 20, 1944 |

UNITED STATES PATENT OFFICE

CERTIFICATE OF CORRECTION

Patent No. 2,921,428             January 19, 1960

Helmut O. Lütcke et al.

It is hereby certified that error appears in the above numbered patent requiring correction and that the said Letters Patent should read as corrected below.

In the grant, lines 2 and 3, for "assignors to Aktiengesellschaft fur Unternehmungen, of Essen, Germany," read -- assignors to Aktiengesellschaft fur Unternehmungen Der Eisen-Und Stahlindustrie, of Essen, Germany, --; line 12, for "Aktiengesellschaft fur Unternehmungen, its successors" read -- Aktiengesellschaft fur Unternehmungen Der Eisen-Und Stahlindustrie, its successors --; in the heading to the printed specification, lines 4 and 5, for "assignors to Aktiengesellschaft fur Unternehmungen, Essen, Germany" read -- assignors to Aktiengesellschaft fur Unternehmungen Der Eisen-Und Stahlindustrie, Essen, Germany --.

Signed and sealed this 28th day of June 1960.

(SEAL)
Attest:
KARL H. AXLINE
Attesting Officer

ROBERT C. WATSON
Commissioner of Patents